Nov. 26, 1935.    L. L. SMALLEY    2,022,057
APPARATUS FOR TESTING BRAKES
Filed April 14, 1933    3 Sheets-Sheet 1
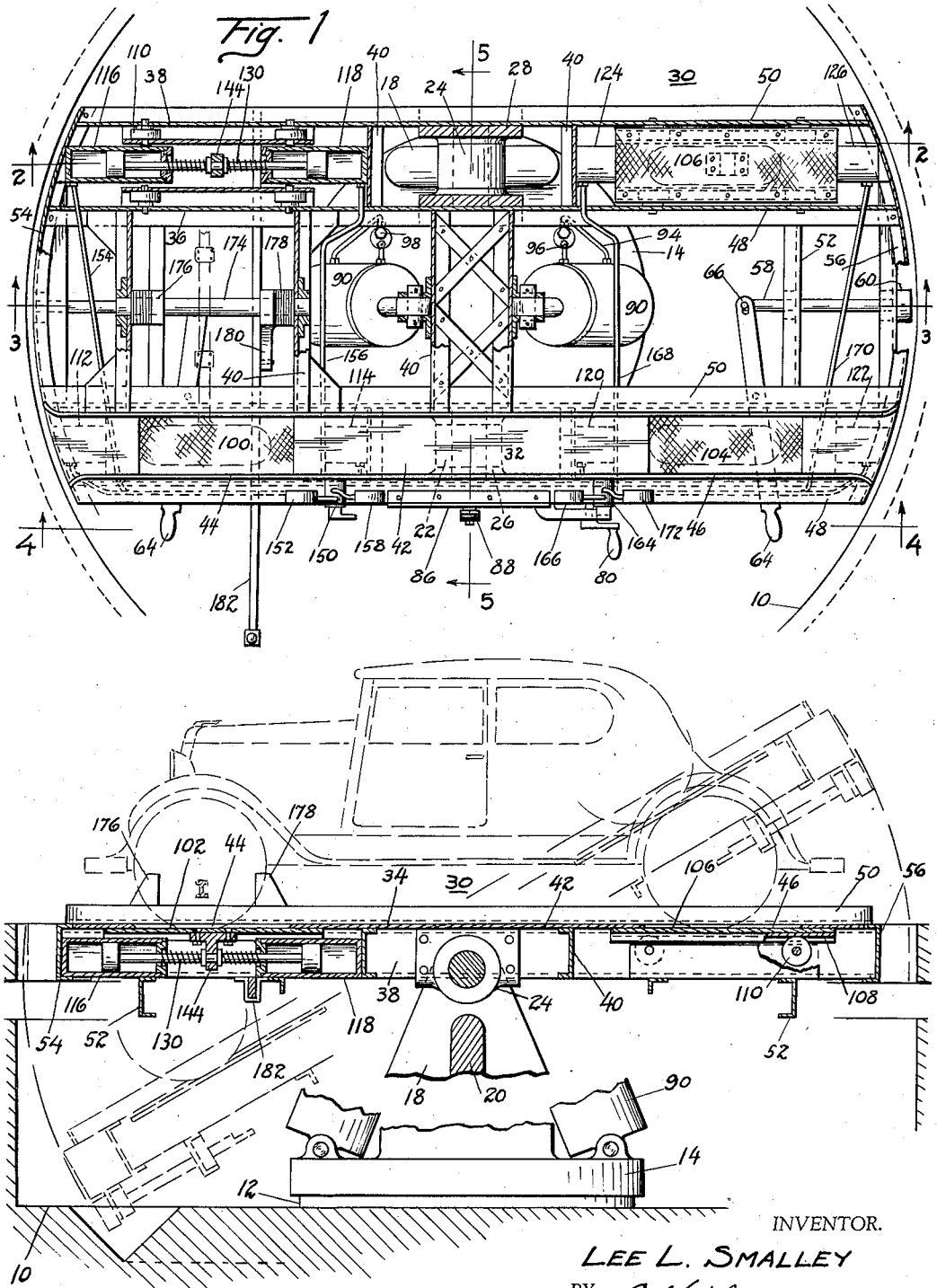
INVENTOR.
LEE L. SMALLEY
BY O. H. Fowler
ATTORNEY.

Nov. 26, 1935.  L. L. SMALLEY  2,022,057

APPARATUS FOR TESTING BRAKES

Filed April 14, 1933  3 Sheets-Sheet 2

INVENTOR.
LEE L. SMALLEY
BY
ATTORNEY.

Nov. 26, 1935.          L. L. SMALLEY          2,022,057
APPARATUS FOR TESTING BRAKES
Filed April 14, 1933          3 Sheets-Sheet 3
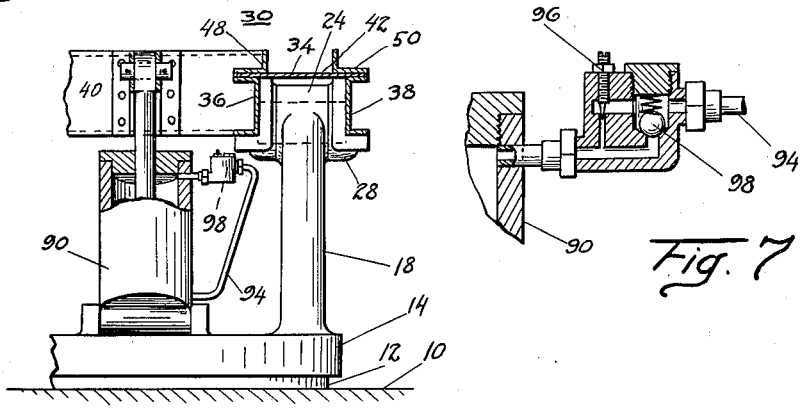
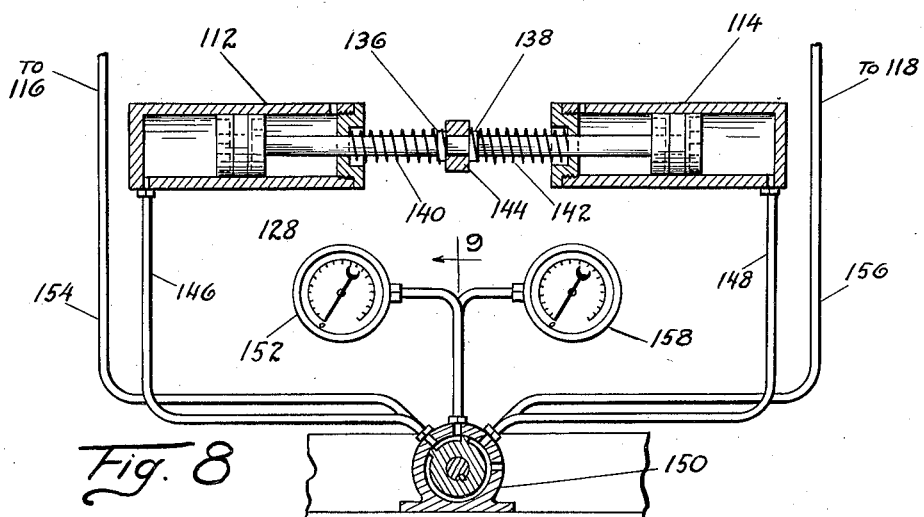
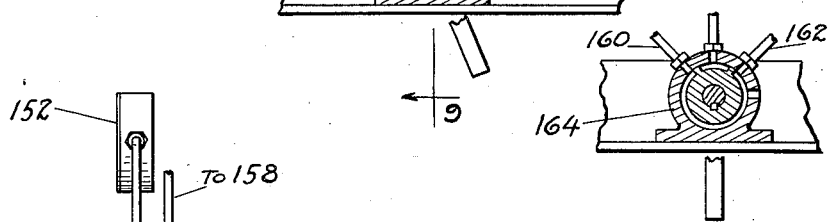
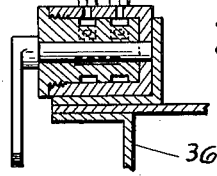
INVENTOR.
LEE L. SMALLEY
BY C. H. Fowler
ATTORNEY.

Patented Nov. 26, 1935

2,022,057

UNITED STATES PATENT OFFICE 2,022,057

APPARATUS FOR TESTING BRAKES

Lee L. Smalley, South Bend, Ind., assignor to Bendix-Cowdrey Brake Tester, Inc., South Bend, Ind., a corporation of Delaware Application April 14, 1933, Serial No. 666,201

14 Claims. (Cl. 265—47)

This invention relates to brake testers, and more particularly to an apparatus for testing the brakes of vehicles.

Broadly the invention comprehends an apparatus for testing the brakes of a vehicle for the purpose of determining their relative retarding capacity, and for simultaneously testing the brakes in both forward and reverse braking.

An object of the invention is to provide a brake testing apparatus of simple construction and operation for testing the brakes of a vehicle with a minimum consumption of power and a minimum expenditure of labor, and without substantial rotation of the vehicle wheels.

A feature of the invention is a rotatable, tiltable platform. The platform has arranged thereon longitudinally movable carriages adapted to support the four wheels of a vehicle. The carriages are connected with force registering means for individually and simultaneously resisting movement thereof. The platform is tiltable in two directions to cause the vehicle to move thereon forward or backward, due to the pull of gravity, against the resistance of the brakes associated with the wheels of the vehicle and the resisting measuring means, resulting in an efficient test of the frictional capacity of the brakes in both forward and reverse braking.

Other objects and features of the invention will be apparent from the following description taken in connection with the accompanying drawings, illustrating one embodiment of the invention, and in which,—

Figure 1 is a top plan view of a brake testing apparatus embodying the invention;

Figure 2 is a vertical longitudinal sectional view illustrating the tilting platform, in full lines in a horizontal position, and in dotted lines in an inclined position;

Figure 6 is a fragmentary view illustrating the cushioning means;

Figure 7 is a fragmentary view illustrating the valve and metering means connected between the respective ends of the cushioning cylinder;

Figure 8 is a diagrammatic illustration of the pneumatic means for measuring the reistance offered to movement of the carriages;

Figure 9 is a sectional view substantially on line 9—9, Figure 8; and

Figure 10 is a sectional view illustrating one of the control valves in its normal position.

Figure 3:
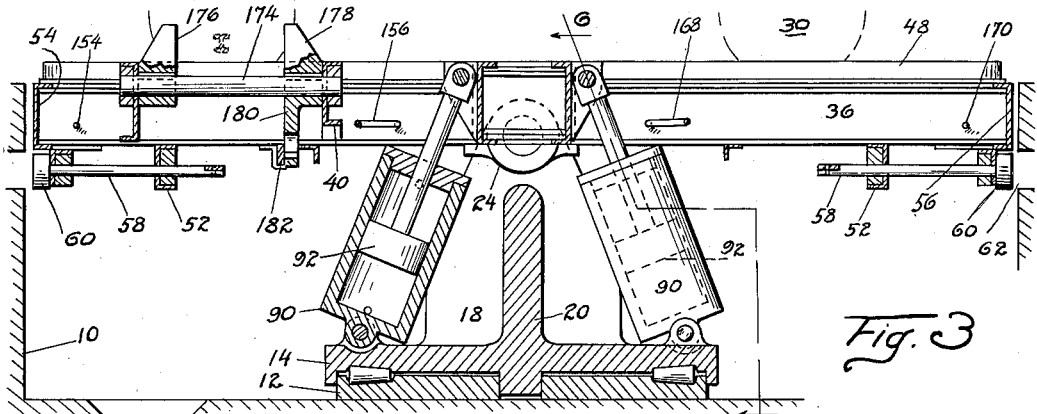
Figure 3 is a vertical sectional view, partly broken away.
Figure 4:
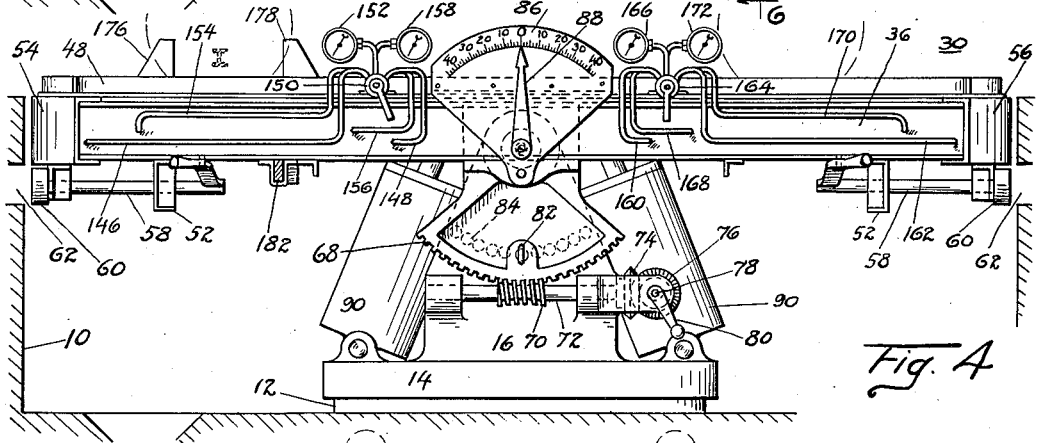
Figure 4 is a side elevation.
Figure 5:
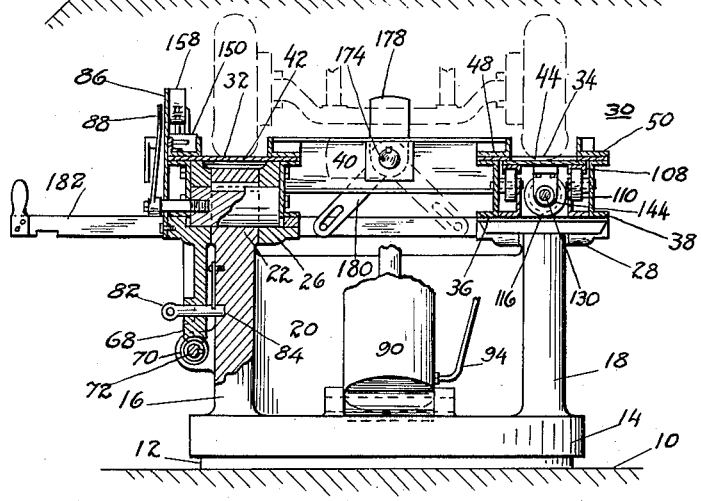
Figure 5 is a cross-sectional view.

Referring to the drawings for more specific details of the invention, 10 represents a circular pit having positioned centrally therein a base 12 supporting for rotation a table 14 having spaced columns 16 and 18 connected as by a web 20, which lends strength and rigidity to the columns.

The columns 16 and 18 have oppositely disposed trunnions 22 and 24 fitted into bearings 26 and 28 secured to a tilting platform indicated generally at 30. The platform includes corresponding runways 32 and 34, each comprising spaced parallel channel members 36 and 38 between which are secured centrally of their respective lengths the bearings 26 and 28. The channel members 36 and 38 are suitably secured together as by cross members 40 and rigidly support a plate 42 having spaced openings 44 and 46, and arranged on the plate 42 are spaced parallel guide rails 48 and 50. The runways 32 and 34 are secured together as by cross members 52, and arcuate end plates 54 and 56 conform to the wall of the pit.

The cross members 52 support at each end of the platform a reciprocal shaft 58 having journaled thereon a roller 60 adapted to engage an annular track 62 in the wall of the pit to maintain the platform in horizontal position, to support the respective ends of the platform, and to facilitate in the rotation thereof. As shown, each of the shafts 58 may be reciprocated through the medium of a hand lever 64 pivoted to a part of the runway and attached to the shaft by a sliding connection 66.

One of the trunions has sleeved thereon a gear segment 68 bolted or otherwise secured to one of the runways. This gear segment meshes with a worm gear 70 secured to a shaft 72 mounted for rotation on the column 16. The shaft 72 has keyed thereon a pinion gear 74 in mesh with a pinion gear 76 secured to a shaft 78 to which is suitably attached a hand crank 80. By turning the hand crank 80 the platform may be tilted or inclined in one direction and then in another, and locked at the desired position by a spring-pressed plunger 82 carried by the gear segment and adapted to engage recesses 84 arranged in spaced relation in an arc of a circle, the center of which is the axis of the trunnion.

In tilting the platform from its normal horizontal position, it is found desirable to know the degree of inclination of the platform, and to that end the platform has secured thereto a plate having thereon a scale 86 arranged in an arc for cooperation with an indicator 88 fixedly secured in the axis of the trunnion.

It has also been found desirable, when tilting the platform from its normal horizontal position, to cushion the movement thereof so that jerking and jarring may be avoided. This may be effectively accomplished by hydraulic means, such as a cylinder 90 having a piston 92, the cylinder and piston being pivotally connected between the table 12 and the tilting platform 30. Preferably these instrumentalities are arranged in opposed relation, one on each side of the pivotal axis of the platform. As shown, the respective ends of each of the cylinders 90 are connected by a conduit 94 having an adjustable metering means 96 and a ball valve 98 interposed for effectively controlling the flow of liquid from one end of the respective cylinders to the other.

Arranged beneath the openings 44 and 46 in the runways 32 and 34 are longitudinally movable carriages 100, 102, 104 and 106. Each carriage has suitably secured thereto parallel channel members 108 for the reception of rollers 110 journaled on the opposed sides of the channel members 36 and 38 of the respective runways 32 and 34.

Beneath the respective carriages 100, 102, 104 and 106 are pairs of opposed cylinders 112, 114, 116, 118, 120, 122, 124 and 126, and double headed pistons 128, 130, 132 and 134 are positioned for reciprocation in the respective cylinders. The rods of the pistons have arranged thereon spaced stops 136 and 138, and sleeved on the rods between the heads of the cylinders and the stops are coil springs 140 and 142. Dependent forks 144 on the respective carriages engage the rods between the stops.

The cylinders 112 and 114 are connected by conduits 146 and 148, respectively, through a control valve 150 to a pressure gauge 152. The oppositely disposed cylinders 116 and 118 are connected by conduits 154 and 156, respectively, through the control valve 150 to a pressure gauge 158. The cylinders 120 and 122 are connected by conduits 160 and 162, respectively, through a control valve 164 to a pressure gauge 166, and the cylinders 124 and 126 are connected by conduits 168 and 170, respectively, through the control valve 164 to a pressure gauge 172.

The control valves 150 and 164 are so constructed and arranged that they may be manipulated to connect the cylinders 112 and 116 to the gauges 152 and 158, respectively, and the cylinders 120 and 124 to the gauges 166 and 172, respectively, or to connect the cylinders 114 and 118 to the gauges 152 and 158, respectively, and the cylinders 122 and 126 to the gauges 166 and 172, respectively. The object of this arrangement will hereinafter fully appear.

On one end of the platform is an abutment for limiting movement of a vehicle when the brakes thereof are undergoing a test. The abutment includes a shaft 174 journaled in the cross members connecting the runways. The shaft has keyed thereto spaced parallel arms 176 and 178 adapted to straddle one of the axles of the vehicle. The arms are sufficiently spaced to provide for limited forward and backward movement of a vehicle on the platform. One of the arms has an extension 180 slidably connected to a reciprocable bar 182. By sliding the bar 182 the abutment may be shifted into or from position.

In operation, the vehicle is moved onto the platform and positioned with its wheels resting respectively on the carriages 100, 102, 104 and 106. The brakes of the vehicle are then applied. With the vehicle in this position, the abutment is elevated so that the arms 176 and 178 straddle one of the axles of the vehicle to limit forward and backward movement thereof.

Now, upon shifting the lever 64 to retract the shaft 58 and thereby remove the roller 60 from the track 62, the platform may be rocked upon its support by turning the crank 86. When the platform is rocked the degree of incline of the platform will be indicated on the dial 86. This is an important factor in measuring the effectiveness of brakes because the pull of gravity under which the car is moved is dependent on the weight of the vehicle and the degree of incline of the platform.

Assuming that the vehicle is positioned on the platform, that the valves 150 and 164 have been manipulated to connect the gauges 152, 158, 166 and 172 to the cylinders 112, 116, 120 and 124, respectively, and that the platform is tilted in the position shown in dotted lines in Figure 2, the vehicle with the brakes applied to resist rotation of the wheels on the carriages 100, 102, 104 and 106 will under the pull of gravity cause the carriages to move slowly toward the lowered end of the platform against the resistance of pressure built up in the cylinders 112, 116, 120 and 124, each in proportion to the frictional gripping efficiency of the associated vehicle brake. The relative pressure built up in the cylinders will be indicated by the pressure gauges 152, 158, 166 and 172. These gauges give a visular indication of the comparative condition of the brakes associated with the wheels of the vehicle when the brakes are applied in forward braking.

Now, by manipulating the valves 150 and 164 to connect the gauges 152, 158, 166 and 172 with the cylinders 114, 118, 122 and 126 and tilting the platform in the reverse position, the carriages 100, 102, 104 and 106 will move slowly toward the other end of the platform against the resistance of the pressure built up in the cylinders 114, 118, 122 and 126, each in proportion to the frictional gripping efficiency of the brakes associated with the vehicle wheel resting on the respective carriages, the relative pressure built up in the cylinders being indicated by the pressure gauges 152, 158, 166 and 172. In this instance the gauges indicate the comparative condition of the brakes when applied in reverse braking.

Upon completing the test, the platform is returned to its normal horizontal position and the levers 64 are shifted to engage the rollers 60 with the track 62. The platform is then rotated one-half a revolution, the abutment is lowered, and the car run off the platform.

Although this invention has has been described in connection with certain specific embodiments, the principles involved are susceptible of numerous other applications that might readily occur to persons skilled in the art. The invention is, therefore, to be limited only as indicated by the scope of the appended claims.

Having thus described the various features of the invention, what I claim as new and desire to secure by Letters Patent is:—

1. A brake testing apparatus comprising a rockable platform tiltable in two directions, and brake testing units thereon operable to turn the wheels of a vehicle supported thereon in either direction as determined by the tilt of the platform.

2. A brake testing apparatus comprising a rotatable, rockable platform tiltable in two directions, and brake testing units thereon operable to turn the wheels of a vehicle supported thereon in either direction as determined by the tilt of the platform.

3. A brake testing apparatus comprising a rotatable, rockable platform, brake testing units thereon operable to turn the wheels of a vehicle supported thereon in either direction as determined by the tilt of the platform, means for rocking the platform to tilt the platform forward and backward, and means for cushioning the rocking movement of the platform.

4. A brake testing apparatus for motor vehicles comprising a rotatable, rockable support, a member thereon movable in the directions of the tilt of the support, means resisting movement of the member in one direction, means resisting movement of the member in the other direction, means for tilting the support forward and backward so that the force of gravity may act to move the vehicle on the member relative to the member, and means for measuring the resistance to movement of the member in both directions.

5. A brake testing apparatus for motor vehicles comprising a rotatable tiltable support, parallel members movable thereon in the directions of the tilting, means for independently resisting movement of the members in one direction, means for independently resisting movement of the members in the other direction, means for tilting the support in two directions so that the force of gravity may act to move the vehicle on the members relative to the members, and means for independently measuring the resistance to the movement of the members in both directions.

6. A brake testing apparatus for motor vehicles comprising a rotatable tiltable support, parallel members each movable on the support in the directions of the tilting, means for simultaneously and independently resisting movement of the members in one direction, means for simultaneously and independently resisting movement of the members in the other direction, means for tilting the support in two directions so that the force of gravity may act to move the vehicle on the members relative to the members, and means for independently measuring the resistance to movement of the members in both directions.

7. A brake testing apparatus for motor vehicles comprising a rotatable, tiltable support, means for rotating the support, a plurality of members on the support movable in the directions of the tilting of the support and adapted to support the wheels of a vehicle, means for simultaneously and independently resisting movement of the members in one direction, means for simultaneously and independently resisting movement of the members in the other direction, means for tilting the support in two directions so that the force of gravity may act to move the vehicle on the members relative to the members, and means for independently measuring the resistance to movement of the members in both directions.

8. A brake testing apparatus for motor vehicles comprising a rockable platform, wheel supporting members thereon movable in the directions of the tilting of the platform, means for simultaneously and individually resisting movement of the members in one direction, means for simultaneously and individually resisting movement of the members in the other direction, means for tilting the platform in two directions so that the force of gravity may act to move the vehicle on the members relative to the members, and means for individually measuring the resistance to movement of the members in both directions.

9. A brake testing apparatus for motor vehicles comprising a rockable platform, wheel supporting members movable on the platform in the directions of the tilting of the platform, means for simultaneously and independently resisting movement of the members in one direction, means for simultaneously and independently resisting movement of the members in the other direction, means for rocking the platform so that the force of gravity may act to move the vehicle on the wheel supporting members relative to the members, means for indicating the inclination of the platform, and means for independently measuring the resistance to movement of the members in both directions.

10. A brake testing apparatus for motor vehicles comprising a rockable platform, wheel supporting members movable on the platform in the directions of the tilting of the platform, means for simultaneously and independently resisting movement of the members in one direction, means for simultaneously and independently resisting movement of the members in the other direction, means for rocking the platform so that the force of gravity may act to move the vehicle on the wheel supporting members relative to the wheel supporting members, means for cushioning the rocking movement of the platform, means for indicating the inclination of the platform, and means for independently measuring the resistance to movement of the members in both directions.

11. A brake testing apparatus for motor vehicles comprising a tiltable support, a longitudinally shiftable member thereon movable in the directions of the tilting of the support, pressure means resisting movement of the member in one direction, pressure means resisting movement of the member in the other direction, means for tilting the support in two directions so that the force of gravity may act to move the vehicle on the shiftable member relative to the shiftable member, a measuring means, and means for alternately connecting the measuring means with the respective pressure means.

12. A brake testing apparatus for motor vehicles comprising a rockable support, a plurality of carriages each movable thereon in the directions of the tilting of the support, plural pressure means each resisting a carriage in one direction of movement, means for tilting the support so that the force of gravity may act to move the vehicle on the carriages relative to the carriages, and means for individually measuring the resistance to movement of the carriages in both directions.

13. A brake testing apparatus for motor vehicles comprising a support tiltable in two directions, a carriage on the support movable in the directions of the tilting of the support, opposed cylinders on the support beneath the carriage, a double end piston reciprocable in the cylinders, means connecting the piston to the carriage, means for tilting the support so that the force of gravity may act to move the vehicle on the carriage relative to the carriage, a measuring means, and means for alternately connecting the measuring means to the cylinders.

14. A brake testing apparatus for motor vehicles comprising a rockable support, a plurality of longitudinally movable carriages on the support movable in the directions of the tilting of the support, a pair of opposed cylinders on the support beneath each of the carriages, a double-ended piston reciprocable in each pair of cylinders, means connecting the respective pistons to the respective carriages, means for tilting the support so that the force of gravity may act to move the vehicle on the carriages relative to the carriages, measuring means associated with each pair of cylinders, and means for alternately connecting the measuring means with the respective cylinders of each pair of cylinders.

LEE L. SMALLEY.